United States Patent [19]
Cok

[11] Patent Number: 6,084,986
[45] Date of Patent: Jul. 4, 2000

[54] SYSTEM AND METHOD FOR FINDING THE CENTER OF APPROXIMATELY CIRCULAR PATTERNS IN IMAGES

[75] Inventor: David R. Cok, Rochester, N.Y.

[73] Assignee: Eastman Kodak Company, Rochester, N.Y.

[21] Appl. No.: 08/387,669

[22] Filed: Feb. 13, 1995

[51] Int. Cl.$^7$ .............................. G06K 9/46; G06K 9/36
[52] U.S. Cl. ........................................... 382/203; 382/288
[58] Field of Search .................................. 382/203, 286, 382/288, 300, 123, 199, 204, 205, 243, 266

[56] References Cited

U.S. PATENT DOCUMENTS

| | | | |
|---|---|---|---|
| 3,541,246 | 11/1970 | Goldfischer | 178/6.8 |
| 3,803,394 | 4/1974 | Fraser | 235/183 |
| 3,983,368 | 9/1976 | Csakvary et al. | 235/151.3 |
| 4,004,083 | 1/1977 | Norem | 358/125 |
| 4,197,888 | 4/1980 | McGee et al. | 144/209 |
| 4,219,847 | 8/1980 | Pinkney et al. | 358/126 |
| 4,521,966 | 6/1985 | Karlsson | 33/1 |
| 4,628,469 | 12/1986 | White | 364/560 |
| 4,644,583 | 2/1987 | Watanabe et al. | 382/22 |
| 4,720,870 | 1/1988 | Billiotte et al. | 382/8 |
| 4,737,031 | 4/1988 | Mahlberg et al. | 356/372 |
| 4,790,023 | 12/1988 | Matsui et al. | 382/8 |
| 4,805,123 | 2/1989 | Specht et al. | 364/559 |
| 4,811,776 | 3/1989 | Bolton et al. | 144/357 |
| 4,896,279 | 1/1990 | Yoshida | 364/559 |
| 5,164,994 | 11/1992 | Bushroe | 382/8 |
| 5,189,711 | 2/1993 | Weiss et al. | 382/25 |

*Primary Examiner*—Matthew Bella
*Attorney, Agent, or Firm*—David M. Woods

[57] ABSTRACT

A center of an approximately circular pattern in a physical image can be determined by scanning the physical image to produce an array of digital values. The array of digital values are used to calculate a score at each of a set of candidate center locations. The candidate center location having the highest score is selected as the best overall center for the entire pattern. Typically, the scores are computed on discrete rectangular grid locations, which gives the location of the center to the resolution of the discrete grid. The location can be determined to a finer resolution by recomputing the scores over a grid that has a finer resolution, but only extends over a small neighborhood around the first estimate of the center. This refinement can be repeated an arbitrary number of times. After the final refinement, the resulting estimate of the center location can be taken as the final estimate, or a final interpolation can be performed.

10 Claims, 1 Drawing Sheet

SYSTEM AND METHOD FOR FINDING THE CENTER OF APPROXIMATELY CIRCULAR PATTERNS IN IMAGES

TECHNICAL FIELD

The present invention is directed to the field of image processing and, more particularly, to finding the center of approximately circular patterns in images.

BACKGROUND ART

In automated clinical diagnostics, a droplet of some fluid to be tested is placed on a reactive medium. The resulting reaction produces information relevant to the clinical test being performed. This information is obtained automatically by measuring qualities related to the optical density of the test medium after the reaction has taken place or while the reaction is occurring. However, since the droplet does not spread uniformly, the density pattern on the substrate is not uniform, nor is the droplet placed in precisely the same spot on each measurement. Thus, it is desirable to locate the center of the density pattern, as this corresponds to the position at which the droplet is placed. All diagnostic measurements can then be made relative to this position. This will reduce the variability of the measurements and improve their quality.

Typically, the density patterns are not precisely circular, there is noise in the measurement of the pattern, and the nature of the pattern will be different for different diagnostic procedures. In general, density patterns tend to be a collection of digital values related to the optical densities at specific locations in the original image.

Techniques are known for estimating the center and radius of a circular arc in a binary image, and for finding the centers and radii of multiple such arcs using; for example, the widely known Hough transform. Unfortunately, this requires applying thresholds to the gradient images in order to create binary images and loses information about the strength of the gradient and its local direction. In addition, these techniques find a center for each circular arc, whereas what is often needed is the best overall center for the entire pattern.

It is seen then that it would be desirable to have a modified system and method for determining the best central location in an image.

SUMMARY OF THE INVENTION

The present invention is a method and system for determining the best central location in an image, which comprises determining a score for each of a set of candidate center locations. The center location with the highest score is the most likely center of those in the set of candidates. The center location can then be refined by evaluating the score on a more finely spaced set of candidate locations, or by interpolating amongst those locations for which the score has already been determined.

In accordance with one aspect of the present invention, a center of an approximately circular pattern in a physical image can be determined by scanning the physical image to produce an array of digital values. The array of digital values are used to calculate a score at each of a set of candidate center locations. The candidate center location having the highest score is selected as the best overall center for the entire pattern.

Typically, the scores are computed on discrete rectangular grid locations, which gives the location of the center to the resolution of the discrete grid. In alternative embodiments, the location can be determined to a finer resolution by recomputing the scores over a grid that has a finer resolution, but only extends over a small neighborhood around the first estimate of the center. This refinement can be repeated an arbitrary number of times, after which the resulting estimate of the center location can be taken as the final estimate, or a final interpolation can be performed.

Accordingly, it is an object of the present invention to provide a system and method useful in image processing. The concept of the present invention can be used for the processing of images where it is desired to determine the center of the image, such as for images obtained in clinical diagnostic systems. The present invention is useful in finding the best overall center for an entire pattern, particularly for density patterns which are not precisely circular.

Other objects and advantages of the invention will be apparent from the following description, the accompanying drawings and the appended claims.

DETAILED DESCRIPTION OF THE PREFERRED EMBODIMENTS

Figure 1:
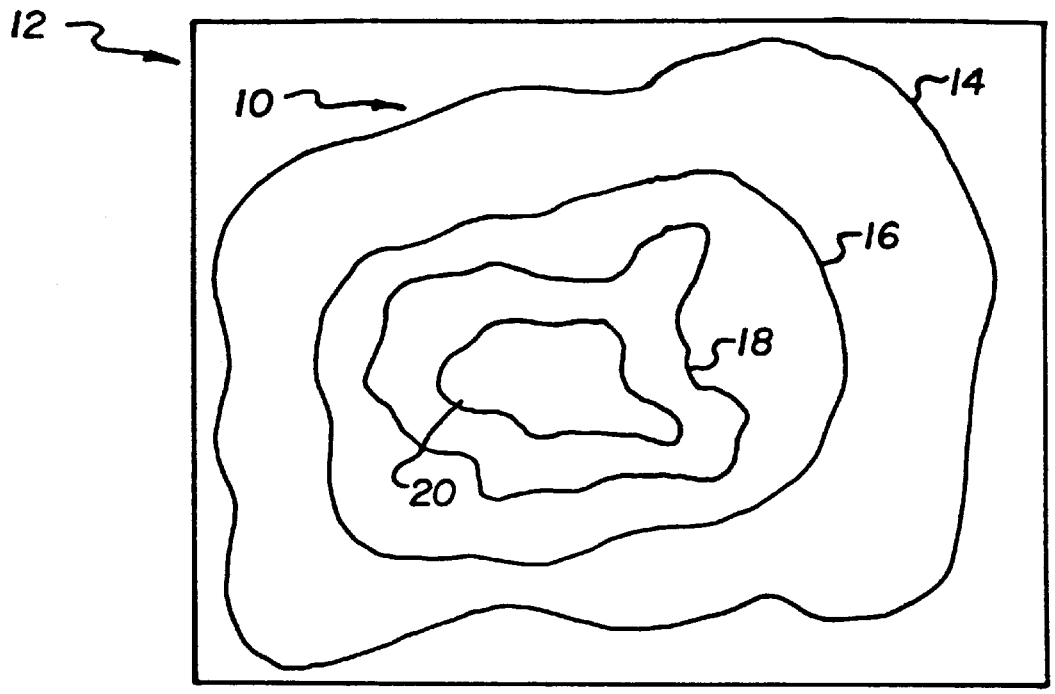
FIG. 1 illustrates contour lines of a roughly circular pattern for which the center is to be estimated, in accordance with the present invention.

Referring to FIG. 1, in accordance with the present invention, the center of an approximately circular pattern 10 in a physical image 12 can be estimated. FIG. 1 illustrates contour lines 14, 16, 18, 20 of the pattern 10 for which the center is to be estimated. Block diagram 22 of FIG. 2 illustrates the steps for estimating the center of the roughly circular pattern 10 of FIG. 1.

Figure 2:
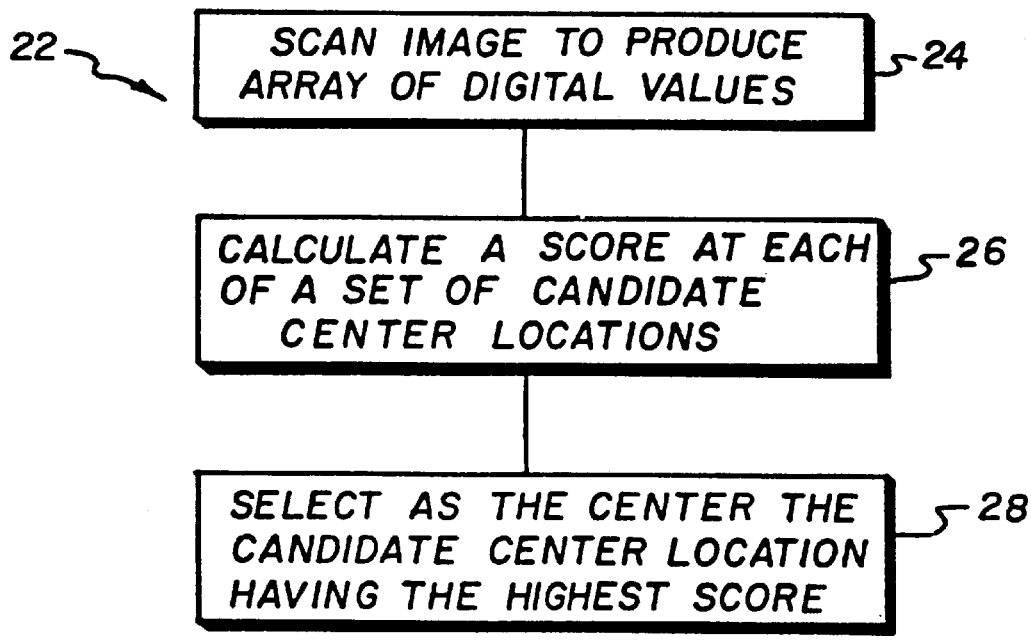
FIG. 2 is a block diagram illustrating the steps for estimating the center of the roughly circular pattern of FIG. 1.

As illustrated in the block diagram of FIG. 2, the initial step 24 in determining the center of approximately circular pattern 10 in physical image 12 is to scan the image 12 to produce an array of digital values, i.e., measure the physical density at each of a rectangular grid of locations in the physical image.

For the purposes of this illustration, it can be assumed that the density measurements are contained in an array, $A[i,j]$, where j is the row ($0 \leq j <$ Nrows), and i is the column ($0 \leq i <$ Ncols). Two derivative arrays can be then computed as follows:

$$DY[i,j] = \text{smedian } (A[i+1,j+1]-A[i+1,j-1], A[i,j+1]-A[i,j-1], A[i-1,j+1]-A[i-1,j-1]);$$

and $$DX[i,j] = \text{smedian } (A[i+1,j+1]-A[i-1,j+1], A[i+1,j]-A[i-1,j], A[i+1,j-1]-A[i-1,j-1]),$$

where smedian (a,b,c)= a if abs(b)<abs(a)<abs(c) or abs(c)<abs(a)<abs(b) or a=b or a=c;

b if abs(a)<abs(b)<abs(c) or abs(c)<abs(b)<abs(a) or b=c;

c if abs(a)<abs(c)<abs(b) or abs(b)<abs(c)<abs(a);

0 if (a=−b and a !=c and b!=c) or (a=−c and a !=b and c !=b) or (b=−c and a !=b and a !=c).

In accordance with the present invention, a score is then computed, as shown at block 26 of FIG. 2, for a given location of the center, (x,y) where x represents the column coordinate and y represents the row coordinate. It should be noted that x and y need not be integers. The score can be computed in any of a variety of ways, including, for example, according to the following equations:

$$F[x,y]=\text{Sum on } i,j \text{ of } (abs(DX[i,j]*(x-i)+DY[i,j]*(y-j))/sqrt((x-i)*(x-i)+(y-j)*(y-j)));$$

or $$F[x,y]=\text{Sum on } i,j \text{ of } (abs(DX[i,j]*(x-i)+DY[i,j]*(y-j))/((x-i)*(x-i)+(y-j)*(y-j))).$$

The determination on how the score should be computed will depend on the data being used. For example, to more heavily weight data further from the center, the equation using the square root of the denominator may be preferred.

In the equations for the calculation of the location of the center, any terms that have a zero denominator are omitted. Furthermore, it may be that some elements of A are invalid measurements, because, for example, they may lie outside an area of usable densities. In that case, the elements of DX and DY which depend on those elements of A are also invalid and any term of the sum above which depends on those invalid elements is omitted.

The equations above give a score for any given location (x,y) of the center. To find the location of the center, the value of the center, i.e., the value of F[x,y], is computed for a set of locations. As can be seen from the equations above, the score will increase as the location approaches the center of the circular pattern, and will be higher for patterns which are more circular. Hence, the location with the largest value of F is selected as the most likely location of the center, as shown at block 28 of FIG. 2.

Typically, F[x,y] is computed on discrete rectangular grid locations. This will give the location (x0,y0) of the center, to the resolution of the discrete grid. The location can be determined to a finer resolution by recomputing F[x,y] over a grid that has a finer resolution but only extends over a small neighborhood around the first estimate of the center, (x0,y0). This will give an improved estimate (x1,y1) of the center location. This refinement can be repeated an arbitrary number of times. After the final refinement, the resulting estimate of the center location (xn,yn) can be taken as the final estimate or a final interpolation can be performed by fitting the values of F[x,y] computed over the neighborhood to a quadratic or cubic surface and determining the peak of that surface.

INDUSTRIAL APPLICABILITY AND ADVANTAGES

The present invention is useful in the field of image processing in that it determines the center of approximately circular patterns in images. Although the present application is useful in a variety of image processing situations, the present invention is particularly useful in the processing of images obtained in clinical diagnostic systems, where density patterns are not precisely circular. The present invention has the advantage of determining the best overall center for an entire pattern.

Having described the invention in detail and by reference to the preferred embodiment thereof, it will be apparent that other modifications and variations are possible without departing from the scope of the invention defined in the appended claims.

PARTS LIST

10 Pattern
12 Image
14 Contour lines
16 Contour lines
18 Contour lines
20 Contour lines
22 Block
24 Block
26 Block
28 Block

What is claimed is:

1. A method for finding a center of an approximately circular pattern in a physical image, the method comprising the steps of:

scanning the physical image to produce an array of digital values;

applying the array of digital values to a predetermined score calculation;

calculating a score at each of a set of candidate center locations, including a highest score and a lowest score;

determining which one of the set of candidate center locations has the highest score;

selecting as the center of the approximately circular pattern, the candidate center location determined as having the highest score.

2. A method for finding a center of an approximately circular pattern in a physical image as claimed in claim 1 wherein the step of applying the array of digital values to a predetermined score calculation further comprises the step of solving the expression: F[x,y]=Sum on i,j of (abs(DX[i,j]*(x-i)+DY[i,j]*(y-j))/sqrt((x-i)*(x-i)+(y-j)*(y-j))), where (x,y) is a given location of center, x representing a column coordinate and y representing a row coordinate, and where density measurements are contained in an array A[i,j], where j is a row ($0 \leq j < \text{Nrows}$), and i is a column ($0 \leq i < \text{Ncols}$), with DX and DY representing derivative arrays.

3. A method for finding a center of an approximately circular pattern in a physical image as claimed in claim 1 wherein the step of applying the array of digital values to a predetermined score calculation further comprises the step of solving the expression: F[x,y]=Sum on i,j of (abs(DX[i,j]*(x-i)+DY[i,j]*(y-j))/((x-i)*(x-i)+(y-j)*(y-j))), where (x,y) is a given location of center, x representing a column coordinate and y representing a row coordinate, and where density measurements are contained in an array A[i,j], where j is a row ($0 \leq j < \text{Nrows}$), and i is a column ($0 \leq i < \text{Ncols}$), with DX and DY representing derivative arrays.

4. A method for finding a center of an approximately circular pattern in a physical image as claimed in claim 1 wherein the step of applying the array of digital values to a predetermined score calculation further comprises the step of computing the score on discrete rectangular grid locations.

5. A method for finding a center of an approximately circular pattern in a physical image as claimed in claim 4 further comprising the step of recomputing the score at each of a set of candidate center locations over a grid having a finer resolution than the discrete rectangular grid locations.

6. A method for finding a center of an approximately circular pattern in a physical image as claimed in claim 1 further comprising the step of interpolating a plurality of scores to provide an improved estimate of the center.

7. A system for finding a center of an approximately circular pattern in a physical image, comprising:

an array of digital values produced from a scan of the physical image; and a score determined for each of a set of candidate center locations, including a highest score and a lowest score, wherein the candidate center location determined to have the highest score is selected as the center of the approximately circular pattern.

8. A system for finding a center of an approximately circular pattern in a physical image as claimed in claim 7 wherein the score is computed on discrete rectangular grid locations.

9. A system for finding a center of an approximately circular pattern in a physical image as claimed in claim 8 wherein the score at each of a set of candidate center locations is recomputed over a grid having a finer resolution than the discrete rectangular grid locations.

10. A system for finding a center of an approximately circular pattern in a physical image as claimed in claim 7 further comprising means for interpolating a plurality of scores to provide an improved estimate of the center.

* * * * *